United States Patent
Föhl

[11] Patent Number: 5,944,276
[45] Date of Patent: Aug. 31, 1999

[54] DRIVING DEVICE FOR A PASSENGER RESTRAINT SYSTEM

[76] Inventor: Artur Föhl, Auf der Halde 28, 73614 Schorndorf, Germany

[21] Appl. No.: 09/101,572
[22] PCT Filed: Nov. 13, 1997
[86] PCT No.: PCT/EP97/06350
  § 371 Date: Jul. 13, 1998
  § 102(e) Date: Jul. 13, 1998
[87] PCT Pub. No.: WO98/21075
  PCT Pub. Date: May 22, 1998

[30] Foreign Application Priority Data

Nov. 14, 1996 [DE] Germany .......................... 296 19 838

[51] Int. Cl.$^6$ .................................................. B60R 22/46
[52] U.S. Cl. .................................................. 242/374
[58] Field of Search ............................... 242/374, 379.1; 280/805, 806; 297/480; 60/637, 638; 102/216, 531

[56] References Cited

U.S. PATENT DOCUMENTS

| | | | |
|---|---|---|---|
| 3,982,775 | 9/1976 | Lindblad | 280/744 |
| 4,232,886 | 11/1980 | Tsuge et al. | 280/806 |
| 4,789,185 | 12/1988 | Fohl | 280/806 |
| 5,366,245 | 11/1994 | Lane, Jr. | 280/806 |
| 5,482,327 | 1/1996 | Schmid | 280/806 |
| 5,553,890 | 9/1996 | Buhr et al. | 242/374 |
| 5,641,131 | 6/1997 | Schmid et al. | 242/374 |
| 5,642,619 | 7/1997 | Matsuki et al. | 280/806 |
| 5,799,977 | 9/1998 | Miyazaki et al. | 280/806 |
| 5,842,344 | 12/1998 | Schmid | 242/374 |

FOREIGN PATENT DOCUMENTS 0 581 288 A1  2/1994  European Pat. Off. .

*Primary Examiner*—John P. Darling
*Attorney, Agent, or Firm*—Tarolli, Sundheim, Covell, Tummino & Szabo

[57] ABSTRACT

In a driving arrangement for belt tensioners, a working chamber (32) is formed in a housing being assembled of several parts (10, 16), as well as an accommodation space (20) for a gas generator capsule (22), said space being in fluid connection with said chamber. The gas generator capsule (22) is encased by a sleeve (24) which is inserted in sealing contact between said parts (10, 16) of the housing in its accommodation space (20). A pre-chamber (26) is formed in the sleeve (24) opposite the bottom of said gas generator capsule (22).

12 Claims, 3 Drawing Sheets

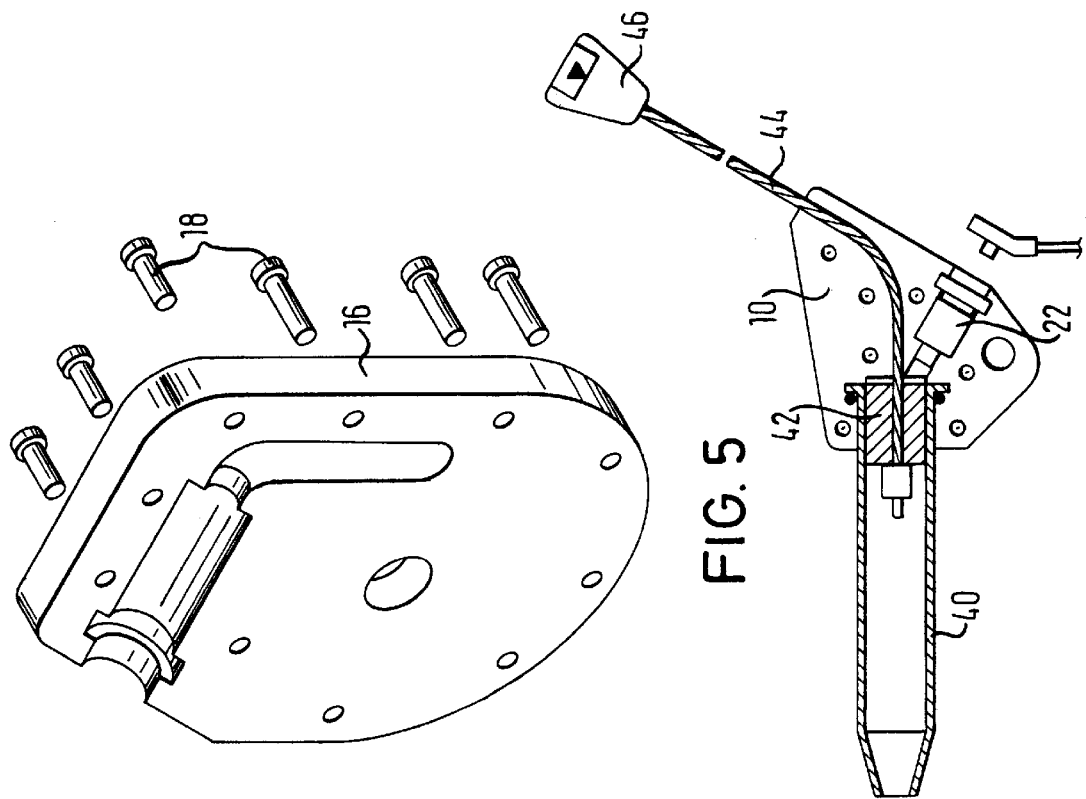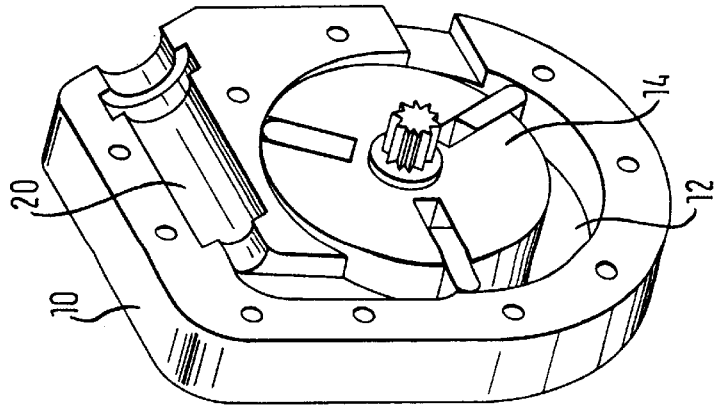

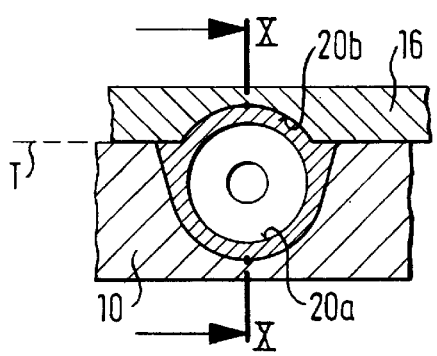
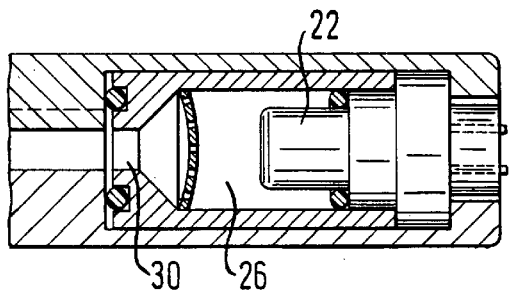
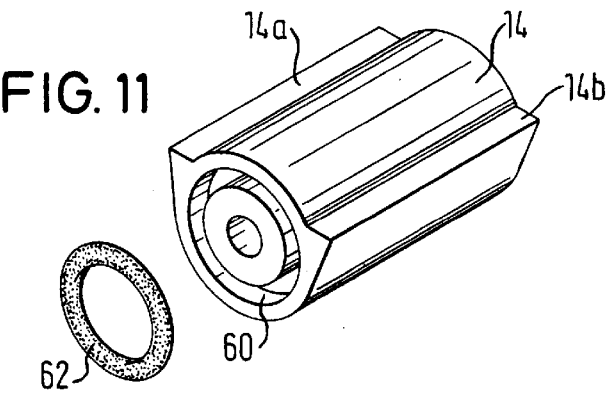
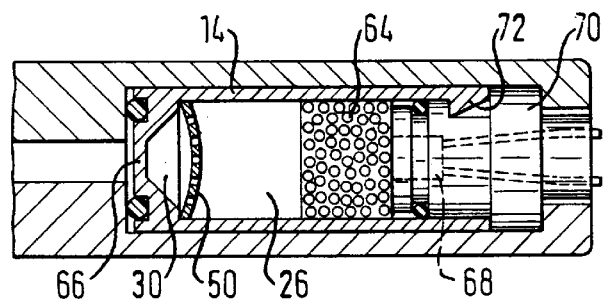
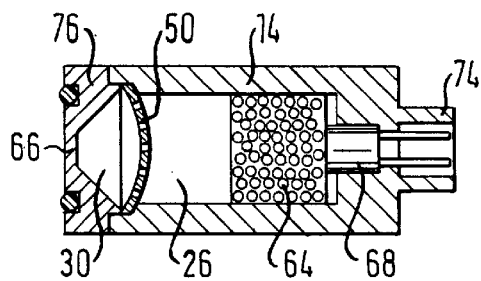

DRIVING DEVICE FOR A PASSENGER RESTRAINT SYSTEM

The invention relates to a driving arrangement for an occupant restraint system, in particular a belt tensioner, comprising a housing assembled of several parts, in which housing a working chamber is formed as well as an accommodation space for a pyrotechnic propellant charge, the accommodation space being in fluid communication with the working chamber.

Driving arrangements of this kind are known to exist in numerous versions. Such systems are generally divided into rotary drive and linear drive arrangements. In both versions, the housing generally consists of a main body and a cover plate placed on an open side of this main body. In the case of a rotary drive, a rotor is arranged inside the housing, which may be a vane-type rotor or a rotary piston rotor. In the case of linear drives, the housing contains a cylinder with a piston movably arranged therein. The working chamber is formed in both cases between the joined housing parts. The generally cylindrical accommodation space for a pyrotechnic gas generator capsule opens into the working chamber. The housing parts are clamped against each other by means of a plurality of screws or rivets. On activation of the propellant charge in the gas generator capsule, an extremely high pressure of short duration develops in the accommodation space of the housing, which may reach a value of 400 to 500 bar or even more.

The invention proceeds from the understanding that immediately after the activation of the gas generator leakage losses occur in the accommodation space of the housing due to the high pressure, resulting in an uncontrolled compressed gas flow into the working chamber. Under these conditions of high pressure stress, the screws or rivets lengthen and a gap is formed which allows further leakage losses. If a pre-chamber is arranged between the accommodation space in the housing and the working chamber, it then becomes possible to dimension the passage section leading into the working chamber in a suitable way, and so to influence the pressure versus time profile, and to adapt it to the constructural parameters of the working piston. When the passage section leading into the working chamber is reduced, for a short time after activating the gas generator the pressure in the working chamber will be considerably lower than that in the pre-chamber. The high pressure in the accommodation space and in the pre-chamber increases the tendency of leakage losses occurring.

The invention effectively prevents the occurrence of leakage losses in the region of the accommodation space and the pre-chamber, if provided. According to the invention, a sleeve surrounding the propellant charge is provided, which sleeve is arranged as a seal between the parts of the housing in its accommodation space. The sleeve forms a sealing along the inner surface of the accommodation space, especially at the parting joint between the housing parts. The compressed gases released by the propellant charge are conducted along the inner surface of the sleeve to the working chamber. In the preferred application of the invention on a rotary drive with a vane-type rotor, a surprisingly high power increase has been noted. This is to lead back on the one hand to the avoidance of leakage losses immediately after activation of the propellant charge, and on the other hand to the additional design possibilities made available by the presence of the sleeve. The realisation that a gap may materialize between the two force-joined housing parts at the moment of activation, through which gap compressed gas escapes, is not to reach in the light of conventional consideration or general investigations. The entire driving process, from the activation of the gas generator to the belt being tensioned, proceeds within a few milliseconds, making a detailed investigation of the leakage situation almost impossible. If the sleeve is extended axially over the length of the gas generator capsule receiving the propellant charge, it may also be used for embodying a pre-chamber arranged upstream of the working chamber, in order to influence the gas pressure versus time profile and to adapt it to the requirements of the driving arrangement.

Preferably, the materials and the wall thicknesses of the sleeve and of the gas generator capsule are of such a nature that the sealing contact between the sleeve and the inner surface of the accommodation space is on the one hand enhanced by the radial expansion pressure of the propellant charge, when activated, and on the other hand by the support provided for the sleeve in the accommodation space of the housing. At the same time, the sleeve is pressed against the wall of the accommodation space in the housing, thereby also increasing the sealing effect in that area.

The components of the housing, i.e. a main body and a cover plate, are preferably realized as shaped parts, for example light alloy die-cast parts, in order to allow an efficient series fabrication. The accommodation space for the propellant charge is constituted by two oppositely arranged recesses in the main body and the cover plate, respectively. In order to facilitate the separation of the shaped parts from the mold, these recesses run out with an obtuse angle at the parting plane between the main body and the cover plate. The sleeve is preferably configured with two ribs parallel to the axis, the ribs adjoining the parting plane between the main body and the cover plate and improving the sealing effect gained by the sleeve, in particular on employing an appropriate synthetic material for the sleeve.

Further features and advantages of the invention will be apparent from the following description and the drawings to which reference is made. In the drawings:

FIG. 4 shows an expanded perspective view of the embodiment shown in FIGS. 1 and 2;

FIG. 5 shows a schematic sectional view of an embodiment of the driving arrangement with a piston/cylinder linear drive;

FIG. 9 shows a cross-section of an embodiment with a housing consisting of shaped parts;

FIG. 10 shows a section along line X—X in FIG. 9;

FIG. 11 shows a perspective view of a sleeve with a gas generator capsule inserted therein;

FIG. 12 shows a variant with a propellant charge directly placed into a sleeve;

FIG. 13 shows a unit consisting of a sleeve, a propellant, an igniter and an outlet nozzle.

Figure 1:
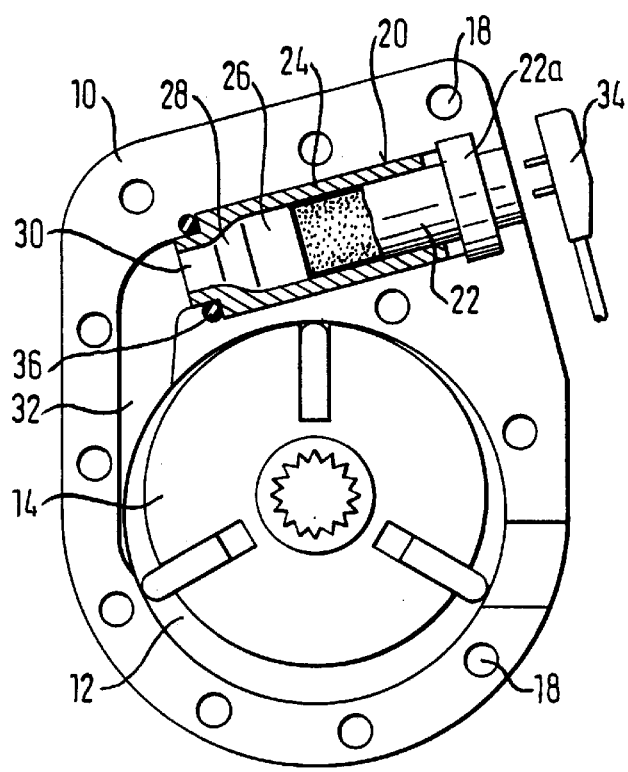
FIG. 1 shows a top view of the main body of a housing of a driving arrangement, with the cover being removed.

The embodiment of a driving arrangement for a belt tensioner, as shown in FIGS. 1 to 4, refers to a rotary drive with a vane-type rotor. The driving arrangement comprises a housing in two parts, the main body 10 of which having a flat bottom as well as a circumferential wall protruding therefrom, the wall delimiting a rotor chamber 12 which in turn contains the vane-type rotor 14. The open side of the main body 10 is closed by a cover plate 16. The cover plate 16 is tensioned to the main body 10 by means of a plurality of screw bolts or rivets 18. In the main body 10, one half of the cylindrical accommodation space 20 is recessed, and in the cover plate 16 the other half of this accommodation space 20 is recessed. In the accommodation space 20, a pyrotechnic gas generator capsule 22 is incorporated which is surrounded by a cylindrical sleeve 24. This sleeve 24 is extended to protrude over the axial end of the gas generator capsule 22 to form a pre-chamber 26 there, which opens, via a narrowed portion 28 and a nozzle 30, into a working chamber 32 disposed upstream of the rotor chamber 12.

The gas generator capsule 22 has a thin-walled cup-like part with an annular collar 22a at the exterior end, for axial fixing in a corresponding seat in the accommodation space 20. FIG. 1 shows an electric connector plug 34 for connection to an electric igniter of the gas generator capsule 22. A mechanical activation by means of a percussion igniter is likewise possible.

When properly dimensioned and made of a suitable material, the sleeve 24 can have a sufficient strength to withstand the expansion pressure generated by the gas generator capsule on its activation. It may, however, also be made of a relatively soft material, such as aluminium. To improve the sealing effect at its inner axial end, an O-ring seal 36 is additionally provided which is placed in an annular groove on the outer circumference of the sleeve 24 and abuts against the inner surface of the accommodation space.

Details of the rotary drive have no bearing on the invention and are, therefore, not dealt with in this description.

Figure 2:
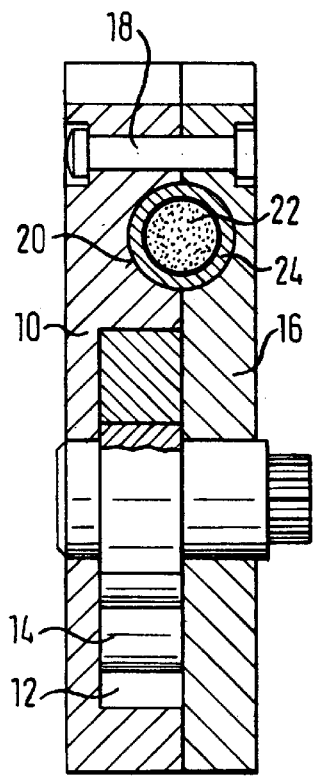
FIG. 2 shows a sectional view of the driving arrangement of FIG. 1 with the cover in position.

As can be seen from FIG. 2, the axis of the cylindrical gas generator cap 22 lies in the parting plane between the main body 10 and the cover plate 16. When the gas generator capsule 22 is activated, its bottom part is blown off, since the cylindrical side wall is supported by the inner surface of the accommodation space 20 via the sleeve 24. An extremely high pressure of short duration reaching several hundred bar is now produced in the pre-chamber 26. As a consequence of the radial component of the expansion pressure, the wall of the gas generator capsule 22 is pressed against the inner surface of the sleeve 24, and the latter against the inner surface of the accommodation space 20. A good sealing is achieved between the two contacting surfaces, preventing any leakage as well as an uncontrolled flow of the compressed gas into the working chamber 32. The gas pressure profile versus time may be influenced by the design of the pre-chamber 26 with its narrowed portion 28 and the nozzle 30, in order to achieve the best possible drive power.

Figure 3:
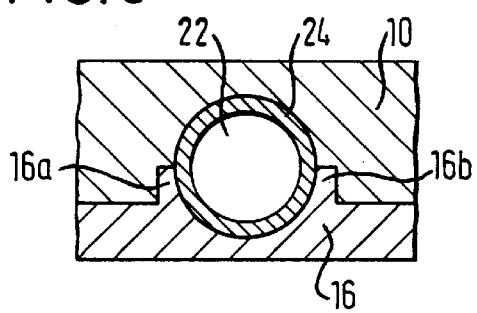
FIG. 3 shows a partial section of one of the embodiments.

In the embodiment shown in FIG. 3, the axis of the gas generator capsule 22 is parallel to, but spaced apart from the parting plane between the main body 10 and the housing cover 16. The housing cover 16 is provided with integrally formed wall sections 16a and 16b, which contact the sleeve 24 at its periphery and engage corresponding recesses in the main body 10 with an interlocking fit. The wall sections 16a and 16b represent an extra path for possible leakage flows, which hence encounter an increased flow resistance.

In the embodiment shown in FIG. 5, the driving arrangement is a linear tensioner with a cylinder 40 and a piston 42 movably arranged therein, the piston engaging a belt buckle 46 via a traction cable 44. The cylinder 40 is attached at one end to a housing which, as in the embodiment described above, comprises a main body 10 and a cover plate (not shown). The main body 10, in the same way as in the embodiment described above, accomodates a gas generator capsule 22 enclosed by a sleeve and sealed within the housing by this sleeve. The sealing may be achieved in the same way as in the embodiment described above, so that a repetition of the description is omitted.

Figure 6:
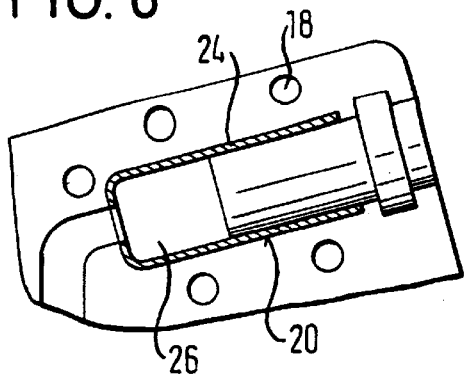

In the embodiment according to FIG. 6, the sleeve 24 has a relatively thin wall and is made of a material of low mecanical strength. In the area of the pre-chamber 26, the sleeve 24 is supported by the inner surface of the accommodation space 20. It should be noted that the sleeve 24 may be made of plastics or may be realised as a thin-walled aluminium cup. When realizing any such embodiment, a greater number of screw bolts or rivets 18 may become necessary.

Figure 7:
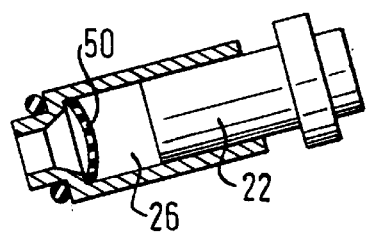
FIGS. 6, 7 and 8 show three variants of a sleeve enclosing a capsule.

In the embodiment shown in FIG. 7, a sieve 50 is provided inside the pre-chamber 26, in order to prevent the ejection of solid particles from the pyrotechnic charge and, in this way, ensure its complete combustion.

Figure 8:
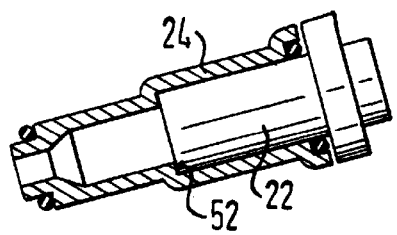

In the embodiment shown in FIG. 8, the sleeve 24 is provided with a stop at the inner end of the gas generator capsule 22, which stop is formed by a surrounding annular shoulder 52 and serves for axially supporting the peripheral bottom rim of the gas generator capsule 22.

In the embodiment shown in FIGS. 9 to 11, the main body 10 and the cover plate 16 are realized as shaped parts, in particular as light alloy die-cast parts. The accommodation space for the gas generator capsule 22 and the sleeve 14 is constituted by two oppositely arranged recesses 20a and 20b in the main body 10 and the cover plate 16, respectively. For facilitating the separation of the shaped parts from the mold, the recesses 20a and 20b each run out with an obtuse angle in the parting plane T between the main body 10 and the cover plate 16. As the recess 20a has a greater depth than the recess 20b, approximately triangle-shaped spaces as viewed in cross-section materialize at the parting plane T, for receiving sealing ribs 14a, 14b of the sleeve 14, the ribs being correspondingly formed and parallel to the axis. At its end face facing away from the gas generator capsule 22, the sleeve is provided with an annular groove 60 with a sealing ring 62 inserted therein.

In the embodiment shown in FIG. 12, the propellant enclosed, if required, by a casing is directly inserted in the sleeve 14. The outlet nozzle is closed by a bursting bottom 66. On the opposite side of the propellant charge 64, there is arranged an igniter 68 being carried by a base 70. The base 70 is fixed in a predefined rotary position in the sleeve 14 by means of latching means 72. Due to the non-symmetric shape of the sleeve (FIG. 11), there results a definite rotary position of the electric plug-in contacts at the base 70 relative to the housing. In this embodiment, the sleeve 14 together with the propellant charge 64 and the igniter 68 can be realized as a pre-assembled component. The interior space of the sleeve 14 is hermetically sealed by the bursting bottom 66, so that the propellant charge is protected against influences from outside.

Departing from the embodiment according to FIG. 12, the variant in FIG. 13 shows the igniter 68 integrated in the body of the sleeve 14. A plug-in base 74 is an integral part of the sleeve, too. For enabling the insertion of the propellant charge 64 and the igniter 68, the sleeve 14 is open at one axial end. After insertion of the propellant 64, the igniter 68 and a sieve plate 50, the sleeve 14 is closed by means of a bottom plate 76 in which the outlet nozzle 30 is formed closed off by the bursting bottom. This bottom plate 76 can be bonded or welded to the sleeve.

I claim:

1. A driving arrangement for an occupant restraint system comprising:

a housing assembled of several parts (10,16), in which housing a working chamber (32) is formed as well as an accommodation space (20) for a pyrotechnic propellant charge (22), the accommodation space being in fluid communication with the working chamber; and a sleeve (24) surrounding the propellant charge and being inserted between the parts (10, 16) of the housing in its accommodation space (20) to act as a seal, characterized in that the propellant charge (64) is inserted in the sleeve (24) itself, together with an igniter (68).

2. The driving arrangement according to claim 1, characterized in that the sleeve (24) and the igniter (68, 70) are provided with interlocking elements (72) for fixing the igniter in its position in the sleeve.

3. The driving arrangement according to claim 1, characterized in that opposite to the propellant charge (64) a pre-chamber (26) is formed in the sleeve (24), the pre-chamber comprising on its end facing away from the propellant charge an outlet nozzle (30) which is hermetically sealed by a bursting base (66).

4. A driving arrangement for an occupant restraint system comprising:

a housing assembled of several parts (10,16), in which housing a working chamber (32) is formed as well as an accommodation space (20) for a pyrotechnic propellant charge (22), the accommodation space being in fluid communication with the working chamber; and a sleeve (24) surrounding the propellant charge and being inserted between the parts (10, 16) of the housing in its accommodation space (20) to act as a seal, characterized in that a pre-chamber (26) is formed in the sleeve (24) opposite to the propellant charge.

5. The driving arrangement according to claim 4, characterized in that the pre-chamber (26) is shaped as a nozzle (30) at its end facing the working chamber (32).

6. The driving arrangement according to claim 5, characterized in that a sieve (50) is inserted in the pre-chamber (26).

7. A driving arrangement for an occupant restraint system comprising:

a housing assembled of several parts (10,16), in which housing a working chamber (32) is formed as well as an accommodation space (20) for a pyrotechnic propellant charge (22), the accommodation space being in fluid communication with the working chamber; and a sleeve (24) surrounding the propellant charge and being inserted between the parts (10, 16) of the housing in its accommodation space (20) to act as a seal, characterized in that the housing consists of a main body (10) and a cover plate (16) placed on an open side of the main body along a parting plane, and that the accommodation space (20) is formed by spaces recessed partly in the main body and partly in the cover plate.

8. The driving arrangement according to claim 7, characterized in that the axis of the cylindrical propellant charge lies in the parting plane of the main body (10) and the cover plate (16).

9. The driving arrangement according to claim 7, characterized in that the axis of the cylindrical propellant charge lies spaced apart from and parallel to the parting plane of the main body (10) and the cover plate (16), and that the cover plate has projecting wall parts (16a, 16b) contacting the propellant charge and engaging corresponding recesses in the main body (10) with an interlocking fit.

10. The driving arrangement according to claim 7, characterized by the main body (10) and the cover plate (16) being configured as shaped parts and having recesses arranged opposite to each other, said recesses constituting the accommodation space (20) and running out in the parting plane at an obtuse angle.

11. The driving arrangement according to claim 10, characterized in that the sleeve (24) comprises two sealing ribs arranged parallel to the axis, the ribs projecting radially from the peripheral surface of the sleeve and being formed at the transition from the parting plane to the recess of the main body (10).

12. The driving arrangement according to claim 7, characterized in that the sleeve (24) comprises on its inner end face an annular groove for receiving a sealing ring.

* * * * *